UNITED STATES PATENT OFFICE.

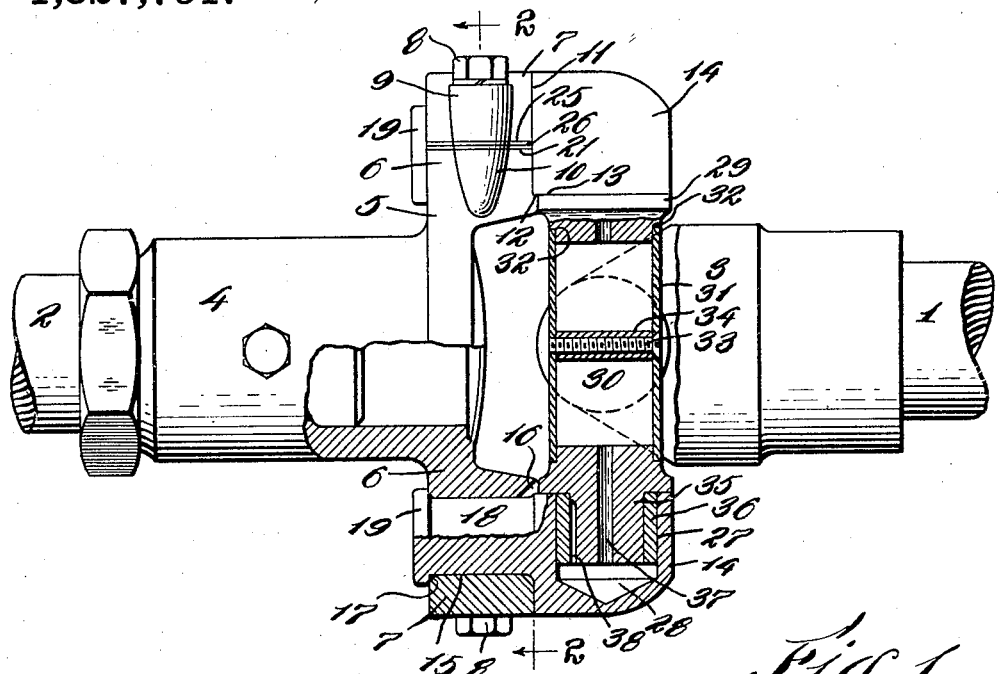

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,327,791.   Specification of Letters Patent.   Patented Jan. 13, 1920.

Application filed May 9, 1919. Serial No. 295,814.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its object to provide a simple and effective means for connecting the bearing blocks for the trunnions to their seats. I secure this object in and through the construction and arrangement of parts illustrated in the drawings forming part hereof, in which Figure 1 represents a side elevation of a joint constructed in accordance with my invention, together with the coöperating shaft sections, certain parts being shown in section; and Fig. 2 a sectional view corresponding to the line 2—2 of Fig. 1.

Describing the various parts by reference characters, 1 and 2 denote a pair of shaft sections each having a hub indicated at 3 and 4, respectively, and each hub having a base flange 5 having at each end thereof a seat for a bearing block. Each seat comprises a member 6 which is rigid with the base and a member 7 which is detachably connected to the member 6, as by means of cap screws 8 mounted in lugs 9 in each removable member and threaded into the coöperating fixed member, as by means of lugs 10.

Each seat has an inner or front seating surface 11 and a shoulder 12 located at the inner end of such seating surface and adapted to engage the inner face 13 of the bearing block 14 to prevent said block from rotating on its seat.

The base 5 and the seats 6 are preferably formed integral, as by a forging operation, and the members 7 are formed separately, each member being provided with a half bore, adapted when the members are assembled, to provide jointly therein a complete bore for the reception of the stud of a bearing block. Each complete bore thus formed comprises a cylindrical intermediate section 15 merging at its front end with a tapered recess 16 and at its rear end with a tapered recess 17.

Each bearing block 14 is provided with a stud 18 having at its rear end a flange or head 19 adapted to engage the rear side of the seat provided by the members 6 and 7.

For the purpose of relieving the cap screws 8 of the thrust due to the rotation of the hub, a special seat is provided between each pair of members 6 and 7. The member 6 is provided with two seating surfaces 20 and 21 on each side of the bore section therein. The seating surfaces 20 extend outwardly from the central portion of the bore 15 and the surfaces 21 extend outwardly from the surfaces 20 and are spaced therefrom by transversely extending shoulders 22. The member 7 is provided with faces 23, 24, and 25, complementary to the faces 20, 21 and 22, respectively. The faces 20, 21, 23 and 24 extend at right angles to the direction of the cap screws 8. As these faces will be machined off to insure accurate fit, one or more shims 26 are interposed between the faces 20 and 23, and the faces 21 and 24, and the cap screws preferably extend through said shims, thereby anchoring them in place.

Each bearing block 14 is shown as provided with a bore 27 extending outwardly from the inner face thereof but terminating within the outer face, thereby to provide a well 28 within such outer face. Each bore is adapted to receive the trunnion of a connecting member, which is shown herein as of the ring type, the said member being indicated generally at 29 and having a central lubricant well 30 which may be provided between plates 31 secured within seats 32 by means of a screw 33 connecting the central portions of said plates and mounted within a spacing sleeve 34. From this ring there project trunnions 35, each shown as mounted within a bushing 36 fitting within a bore 27. Lubricant from the well 30 will be conducted, as by means of axial ports 37 in the trunnions, to the wells 28 and thence by means of a port 38 in the outer face of each trunnion to the spaces between the trunnions and their bushings.

With the parts constructed as described, it will be evident that the torque transmitted to the base 5 will be taken up by the shoulders 24 and 22, thus relieving the lag screws 8 from such torque.

The parts may be conveniently assembled by inserting the studs 18 within the inner portions of the bores 15 and then connecting the members 7 to the members 6 by means of the cap screws 8.

Having thus described my invention, what I claim is:—

1. In a universal joint, the combination of a hub having at each end thereof a seat for the stud of a bearing block, each seat comprising a member rigid with the hub and a member detachably connected to the former member, the said members when connected providing a bore for such stud, each member having a pair of spaced seats separated by an interposed shoulder, and means for connecting said members.

2. In a universal joint, the combination of a hub having at each end thereof a seat for the stud of a bearing block, each seat comprising a member rigid with the hub and a member detachably connected to the former member, the said members when connected providing a bore for such stud, each member having a pair of spaced seats separated by an interposed shoulder, one or more shims interposed between the seats of said members, and means for connecting said members.

3. In a universal joint, the combination of a hub having a seat for the stud of a bearing block, said seat comprising a member rigid with the hub and a member detachably connected thereto, each member having a sectional bore therein for the reception of a stud and each rigid member having a pair of seats each extending outwardly from each side of its bore section and a pair of seats located exteriorly of the first mentioned seats and spaced therefrom by a shoulder and each detachable member having seats complementary to the seats on its coöperating rigid member, and connecting means extending transversely with respect to said seats and securing said members together.

4. In a universal joint, the combination of a hub having a seat for the stud of a bearing block, said seat comprising a member rigid with the hub and a member detachably connected thereto, each member having a sectional bore therein for the reception of a stud, each rigid member having a pair of seats each extending outwardly from each side of its bore section and a pair of seats located exteriorly of the first mentioned seats and spaced therefrom by a shoulder and each detachable member having seats complementary to the seats on its coöperating rigid member, one or more shims interposed between the seats on said members, and bolts extending transversely with respect to said seats and connecting said members and extending through said shim or shims.

5. In a universal joint, the combination of a hub having seats at opposite ends thereof, each seat comprising a member rigid with the hub and a member detachably connected thereto, each member having a sectional bore therein adapted, when the detachable member is connected to its rigid member, to form a complete bore for the stud of a bearing block, and means for connecting the detachable members of said seats to the rigid members, each pair of members being provided with interengaging surfaces adapted to receive the torque exerted upon said seats by their respective studs and to relieve the connecting means therefrom.

In testimony whereof, I hereunto affix my signature.

WILLIAM H. THIEMER.